(12) United States Patent
Epstein

(10) Patent No.: US 7,127,618 B2
(45) Date of Patent: Oct. 24, 2006

(54) DATA PROTECTION VIA REVERSIBLE DATA DAMAGE

(75) Inventor: Michael Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 912 days.

(21) Appl. No.: 09/894,389

(22) Filed: Jun. 28, 2001

(65) Prior Publication Data

US 2003/0005318 A1    Jan. 2, 2003

(51) Int. Cl.
*H04L 9/00* (2006.01)
*H04N 7/167* (2006.01)

(52) U.S. Cl. .................. 713/193; 713/167; 713/189; 380/202

(58) Field of Classification Search ............. 713/193, 713/167, 176; 380/201–204
See application file for complete search history.

(56) References Cited

U.S. PATENT DOCUMENTS

| 4,281,216 | A | * | 7/1981 | Hogg et al. ............ 380/277 |
|---|---|---|---|---|
| 5,034,980 | A | | 7/1991 | Kubota ..................... 380/4 |
| 5,502,766 | A | * | 3/1996 | Boebert et al. .......... 713/193 |
| 5,864,620 | A | | 1/1999 | Pettitt ......................... 380/4 |
| 6,850,252 | B1 | * | 2/2005 | Hoffberg .................. 715/716 |

FOREIGN PATENT DOCUMENTS

WO    0101316 A2    1/2001

* cited by examiner

*Primary Examiner*—Kambiz Zand
(74) *Attorney, Agent, or Firm*—Edward W. Goodman; Paul Im

(57) ABSTRACT

A security system purposely damages at least a portion of content material, using a damaging process that is easily reversible, until a verification of authorization is determined. While the authorization to access the content material is in an unverified state, an undamaged version is provided for immediate rendering, but any stored versions of the content material is stored in the damaged state. When the authorization is verified, the damaging process ceases, and the stored damaged version is repaired, thereby allowing unimpeded subsequent access to the authorized content material. If sufficient evidence is obtained to warrant a determination that the content material is unauthorized, the access to the material is terminated, and any stored content material remains in the damaged state, thereby precluding subsequent access to the unauthorized content material.

19 Claims, 2 Drawing Sheets

DATA PROTECTION VIA REVERSIBLE DATA DAMAGE

BACKGROUND OF THE INVENTION

1. Field of the Invention

This invention relates to the field of data protection, and in particular to protecting data from illicit copying from a remote location.

2. Description of Related Art

The protection of data is becoming an increasingly important area of security. In many situations, the authority to copy or otherwise process information is verified via a time-consuming process. For example, copy-protected material may contain watermarks or other encodings which identify the material as being copy-protected, and also contains other encodings which identify whether this particular copy of the material is an authorized copy, and whether it can be copied again. For example, an authorized copy of content material may contain a robust watermark and a fragile watermark. The robust watermark is intended to be irremovable from the content material without causing damage to the content material. The fragile watermark is intended to be damaged when the content material is illicitly copied. For example, common fragile watermarks are damaged if the content material is compressed or otherwise altered. In this manner, content material that is compressed in order to be efficiently communicated via the Internet will be received with a robust watermark and a damaged fragile watermark. A content-processing device that is configured to enforce copy protection rights in this example will be configured to detect the presence of a robust watermark, and prevent the processing of the content material containing this robust watermark unless the fragile watermark is also present. The time required to verify the presence of a robust and a fragile watermark, however, may be substantial. Other verification schemes may include accessing a remote source to verify a user identification or user authorization, and the transmission time delay may also be substantial. Still other verification schemes, discussed further below, may induce an even longer latency between when the content material is presented for processing and when the content material is verified as being authorized for processing.

In most consumer applications, the consumer expects a relatively immediate response to commands. For example, when a user presses "play" on a CD player, the user expects music to be rendered within a few seconds. If the user has an authorized copy of copy protected material, the user will expect the same relatively immediate response to commands when requesting access to this material. A security system that imposes a noticeable delay before responding to the user's commands for access to authorized content material will not be well received by consumers. In like manner, a security system that allows a substantial portion of unauthorized content material to be processed while the user's authorization is being verified, will not be well received by the providers of protected content material.

BRIEF SUMMARY OF THE INVENTION

It is an object of this invention to provide a system or method of preventing select uses of material until the material is verified as being authorized for the specified use. It is a further object of this invention to provide select access to the material while the verification process is underway. It is a further object of this invention to prevent a subsequent rendering of material that has not been verified.

These objects and others are achieved by providing a security system that purposely damages at least a portion of content material, using a damaging process that is easily reversible. While the authorization to access the content material is in an unverified state, an undamaged version of the material is provided for immediate rendering, but any stored versions of the content material is stored in the damaged state. When the authorization is verified, the damaging process ceases, and the stored damaged version is repaired, thereby allowing unimpeded subsequent access to the authorized content material. If sufficient evidence is obtained to warrant a determination that the content material is unauthorized, the access to the material is terminated, and any stored content material remains in the damaged state, thereby precluding subsequent access to the unauthorized content material.

BRIEF DESCRIPTION OF THE DRAWINGS

The invention is explained in further detail, and by way of example, with reference to the accompanying drawing wherein.

Throughout the drawing, the same reference numerals indicate similar or corresponding features or functions.

DETAILED DESCRIPTION OF THE INVENTION

Figure 1:
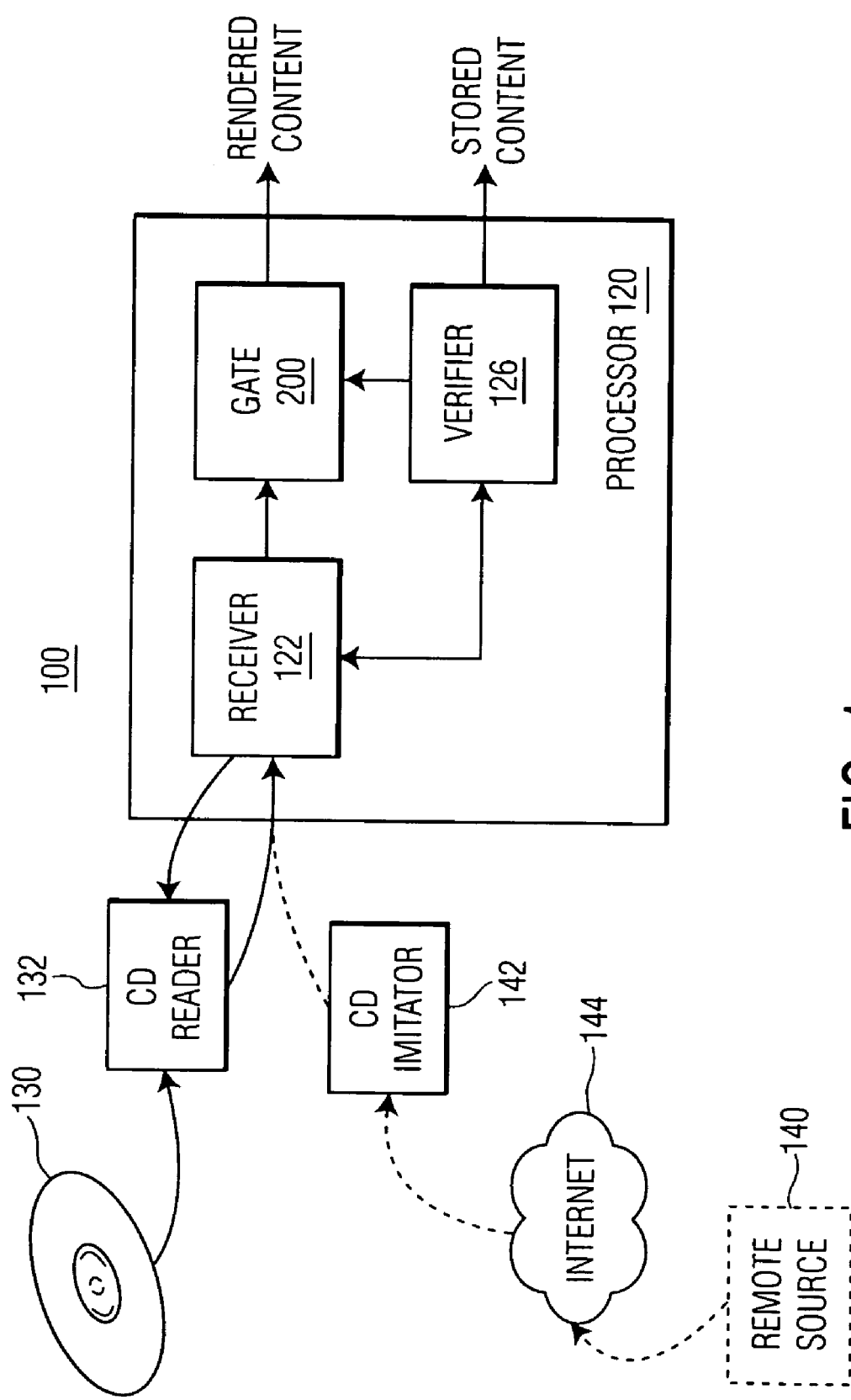
FIG. 1 illustrates an example block diagram of a control access system in accordance with this invention.

FIG. 1 illustrates an example control access system 100 in accordance with this invention. The control access system 100 includes a processor 120 that is configured to process material from a physical media, such as a CD 130, via an access device, such as a reader 132. The processor 120 may be a recording device that records one or more songs from the CD 130 onto a memory stick, onto a compilation CD, and so on. The processor 120 may also be a playback device that is configured to provide an output suitable for human perception, such as images on a screen, sounds from a speaker, and so on, or, it may be a combination of rendering and storage capabilities. The example processor 120 includes a receiver 122 that provides the interface with the access device 132, and a verifier 126 that is configured to verify the presence of authorized material 130.

A common method of misappropriating content material is to copy the material from its original media 130, such as the original purchased CD containing the content material. Such misappropriated content material is often made available from a remote source 140, via the Internet 144. Often, for ease of downloading, individual songs are downloaded, rather than the entire set of material constituting the material on the original media 130. FIG. 1 includes an example "CD Imitator" device 142, for ease of reference to alternative devices that can be configured to provide an output that is substantially indistinguishable from an access device 132. This invention is presented using a misappropriation of material via the Internet as a paradigm for the means of obtaining unauthorized material, although the principles of this invention are applicable to copy-protection schemes in general, without regard to how the unauthorized material is obtained.

Using this example form of misappropriation, when a user commences access to material from the media 130, the processor 120 is configured to verify the presence of the media 130. One method of effecting this verification is to request the access device 132 to provide evidence that the media 130 is available to provide material or information that differs from the material that the user is attempting to render. For example, if the user commences the rendering of a song, the verifier 126 may direct the receiver 122 to request a portion of a different song that is known to be on the media 130 from the access device 132. If the access device is unable to provide the requested portion of a different song, the verifier 126 can conclude that the media 130 is not actually present, and will terminate subsequent rendering or storage of the material, via the gate 200. For example, a user may illicitly download a selection of different copy-protected songs from a remote site 140 on the Internet 144, and then attempt to create a compilation CD containing these user-selected songs. Typically, the size of an entire album of material discourages the downloading of the entire album merely to obtain a user-selected song. When the verifier 126 requests a portion of a different song from the album corresponding to an actual CD 130, the user who downloaded only the user-selected song from the album will be prevented from further rendering of the downloaded material.

A variety of techniques may be employed to assure that the material provided in response to the request corresponds to the material that is contained on the actual CD 130. For example, copending U.S. patent application "Protecting Content from Illicit Reproduction by Proof of Existence of a Complete Data Set via Self-Referencing Sections", U.S. Ser. No. 09/536,944, filed Mar. 28, 2000 for Antonius A. M. Staring, Michael A. Epstein, and Martin Rosner, and incorporated by reference herein, teaches a self-referential data set wherein each section of a data set, such as a copy-protected album, is uniquely identified by a section identifier that is securely associated with each section. To assure that a collection of sections are all from the same data set, an identifier of the data set is also securely encoded with each section. Using exhaustive or random sampling, the presence of the entirety of the data set is determined, either absolutely or with statistical certainty, by checking the section and data-set identifiers of selected sections.

The above example of a verification scheme is intended to illustrate a verification scheme that can be expected to consume a noticeable amount of time before the verification process is completed, particularly if an exhaustive check is performed. A substantial amount of time may pass between the time that the user requests access to the content material and the time that the verifier 126 determines, one way or the other, whether the user is authorized to access the material. During this time, the user, and particularly a user who has an authorized copy of the material, will expect to have access to the content material. Also during this time, however, a user who has an illicit copy of the material will be able to have access to the unauthorized content material.

This invention is based on the assumption that the prevention of the storage of a copy of unauthorized content material is a primary goal of a copy protection scheme, whereas the prevention of a one-time playback of unauthorized content material is not as important, and may be sacrificed in return for user satisfaction.

In accordance with this invention, any stored version of the copy-protected content material is stored in a damaged state, whereas an immediate rendering of the material is permitted in an undamaged state, until the authorization to access the copy-protected content material is verified, or until such verification fails. If the authorization is verified, the damaging process ceases, and the stored damaged material is repaired. In a preferred embodiment of this invention, the damage to the stored material is easily and quickly repairable, and provides a repaired version of the material that is substantially identical to the input content material. By providing a quick repair procedure, the user of authorized material will perceive little, if any, difference from a conventional direct storage of undamaged content material. The gate 200 of the processor 120 is configured to effect the controlled damage and subsequent repair process.

Also in accordance with this invention, if the processor 120 is configured to render the content material for human perception, the gate 200 provides an undamaged version of the material for rendering until the authorization is verified. In this manner, a user is provided an immediate rendering of the material, and is not affected by the verification process. During this verification process, however, any stored material is stored in a damaged state. The undamaged version of the material may be provided directly, by bypassing the damaging process, or may be provided by a repair of damaged material.

Figure 2:
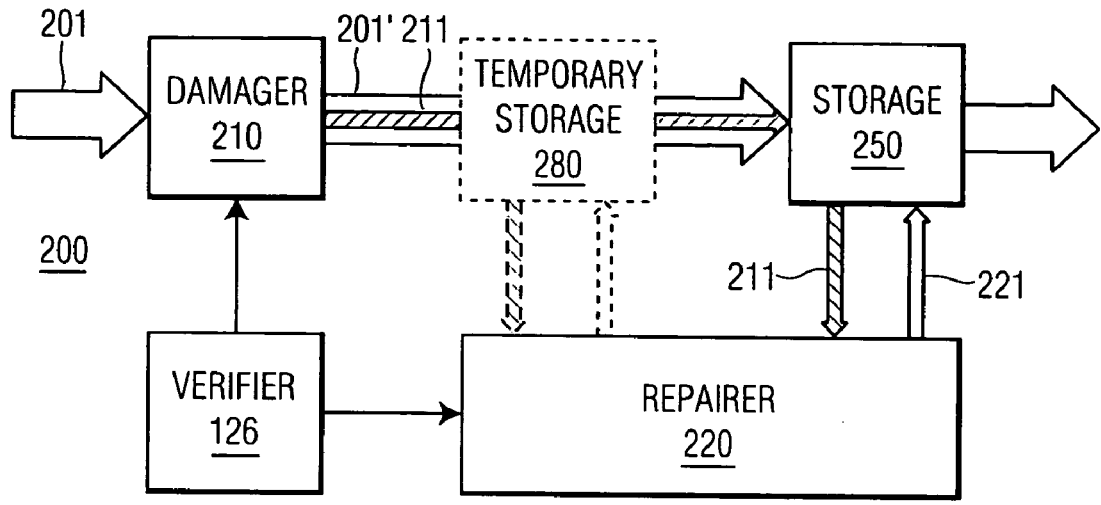
FIG. 2 illustrates an example block diagram of a control gate in accordance with this invention.

FIG. 2 illustrates an example block diagram of a control gate 200 in accordance with this invention. The verifier 126 enables the damager 210 to damage content material 201 before storing it in a storage device 250, until the verifier 126 confirms that the content material is authorized for copying. Depending upon the particular configuration, the gate 200 may include a temporary storage device 280, such as a solid-state memory that buffers the material before transferring it to a more permanent storage 250, such as a disc or portable memory stick. When the verifier 126 verifies that the received content material 201 is authorized for copying, the verifier 126 enables the repairer 220 to effect a repair of the damaged material that was stored. If the temporary storage 280 is available, and the damaged material has not yet been transferred to the storage 250, the repair is effected on the material that is in the temporary storage 280. If damaged material has been communicated to the storage 250, the repairer 220 effects a repair on the material that was stored at the storage 250. Because temporary storage 280 is generally faster and easier to modify than permanent storage 250, a preferred embodiment contains sufficient temporary storage 280 to contain the quantity of content material that is expected to be received during the time required to effect the authorization verification.

In a preferred embodiment, only a portion of the content material 201 is damaged, as indicated by the cross-hatched portion 211 of the transferred content material 201'. By limiting the amount of damage that is introduced, the time and resources required to repair the damage can be minimized. However, to be effective, the amount of damage introduced by the damager 210 is greater than the amount of damage that can be corrected by any error correcting codes in the content material 201, and sufficient to cause a noticeable distortion of the original content material. Beyond the minimum damage required to avoid error correcting schemes, the degree of distortion is heuristically determined, typically by estimating the amount of distortion necessary to discourage a subsequent rendering of the distorted material. This distortion may include, for example, a periodic distortion of the audio segments of entertainment material, distortions of color or contrast in video segments, out-of-sequence storage of the material, out-of-sync storage of audio and video information, and so on.

The choice of determining the portion of the content material to damage is preferably based on the architecture of the storage device. For example, if the storage device is partitioned into tracks and sectors, and data is read and/or written to the storage device as blocks of data of a given size, the damager 210 may be configured to destroy the $M^{th}$ block of every sector. Alternatively, the first byte of every block may be destroyed, or an entire sector in each track may be destroyed, and so on. The choice of a destructive pattern that will have a substantial visible or audible effect, but only require the destruction of portions of the content information, will be evident to one of ordinary skill in the art in view of this disclosure.

Figure 3:
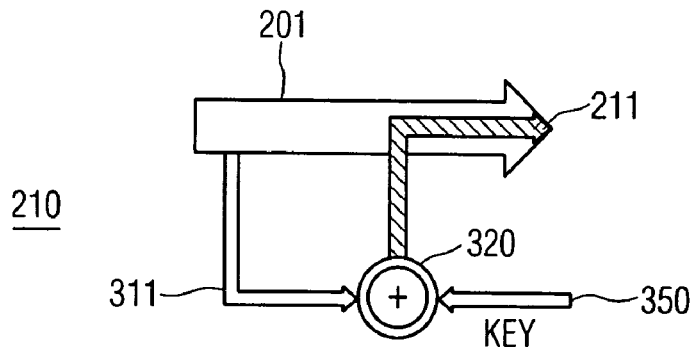
FIG. 3 illustrates an example block diagram of a damaging device in accordance with this invention.

FIG. 3 illustrates an example block diagram of a damager 210 in accordance with this invention. The selected portion 311 of the content material 201 is provided to a destruction device 320. The destruction device 320 can be any function that modifies the selected portion 311 of the input content material 201 in such a manner that it easy to repair by a suitably enabled repairer 220, but difficult to repair otherwise. In the example shown, the destruction device 320 is an exclusive—or device that is configured to compute the exclusive—or of the combination of the selected portion 311 and a key 350, to provide the damaged content material 211. As is known in the art, the exclusive-or function is easily reversible to find one of the original inputs, if the other input is known:

If Damaged=Original $\oplus$ Key, Then Damaged $\oplus$ Key=Original.

Figure 4:
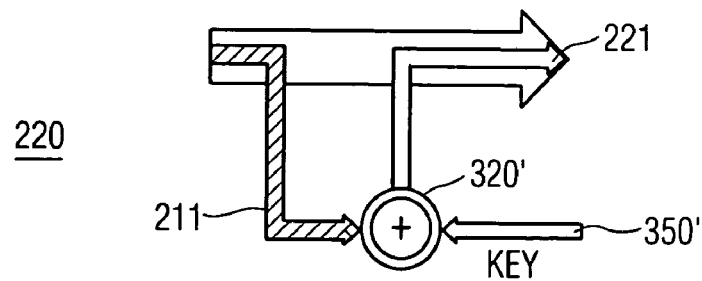
FIG. 4 illustrates an example block diagram of a repairing device in accordance with this invention.

As illustrated in FIG. 4, a corresponding repairer 220 contains an exclusive—or device 320' corresponding to the exclusive—or device 320 of FIG. 3. Because the input to the device 320' is the damaged input 211, the output 221 will correspond to the original undamaged input 311, but only if the same key is used. That is, with knowledge of the key 350, the original undamaged material can be easily recovered by the repairer 220. However, without knowledge of the key, the undamaged material cannot be recovered. Reference numeral 350' is used in FIG. 4 to illustrate a key that is supposed to be equal to the key 350, but may be different. If the repairing key 350' is not equal to the damaging key 350, the output 221 will not be equal to the original undamaged input 311. In like manner, the reference numeral 320' is used in FIG. 4 to illustrate a device that is supposed to contain an reversing function corresponding to the function used in the device 320 of FIG. 3. If the device 320' does not provide an reversing function of the device 320, the damaged material will not be repaired.

To avoid a systematic attempt to determine the key 350 that is used by a particular system, the key 350 for each damaging session is randomly generated by the verifier 126, and, if the verification process is lengthy, multiple random keys 350 may be used. In a preferred embodiment of this invention, a pseudo-random number generator is used, which produces a sequence of random numbers, starting from a seed number; the same sequence is produced whenever the same seed is provided. In such an embodiment, the key 350 in the damager 210 comprises the stream of random numbers produced by the random number generator from a key-seed that is generated for each session. Given this same key-seed, the repairer 220 is provided the same stream of random numbers from the random number generator, for use as the key 350' that restores the original material 221 from the damaged material 211. The use of a changing key further discourages attempts to repair the damaged segments without knowledge of the changing key values. If the verifier 126 determines that the material is unauthorized, the key 350, and any key-seed used to generate the key 350, are destroyed, so that the stored unauthorized material remains damaged.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:

1. An apparatus for receiving, protecting and storing material, said apparatus comprising:
    input means for receiving material in an unprotected form from a remote source;
    means for generating a damaged version of said received material;
    means for storing said damaged version of said received material;
    a verifier for determining an authorization to process said received material; and
    means for repairing the damaged version of said received material in response to said verifier determining the authorization,
wherein:
    the damaging means damages a select portion of the received material to form the damaged version, and
    the repairing means repairs a corresponding select portion of the damaged version to form the repaired version.

2. The apparatus as claimed in claim 1, wherein:
    the verifier determines the authorization based on a verification of a presence of an entirety of a data set corresponding to the received material.

3. The apparatus as claimed in claim 1, wherein:
    said storing means stores the damaged version on a removable media.

4. The apparatus as claimed in claim 1, wherein:
    said storing means stores the damaged version in a temporary storage device, and stores the repaired version in a permanent storage device.

5. The apparatus as claimed in claim 1, wherein the apparatus further comprises:
    means for disabling the damaging means in order to prevent subsequent damage to the received material, after the verifier determines the authorization.

6. The apparatus as claimed in claim 1, wherein
    the damaging means comprises:
    a first device for damaging the select portion of the received material via an exclusive-OR function with a key, and
    the repairing means comprises:
    a second device for repairing the select portion of the damaged version of the received material via an exclusive-OR function with the key.

7. The apparatus as claimed in claim 6, wherein
    the key is provided via a random process.

8. The apparatus as claimed in claim 7, wherein
    the key includes a series of random numbers that are provided via a pseudo-random process based on a key-seed.

9. The apparatus as claimed in claim 6, wherein
    the key is destroyed if the verifier fails to determine the authorization.

10. The apparatus as claimed in claim 1, wherein said apparatus further comprises:
    means for rendering the received material while the verifier is determining the authorization.

11. A method of receiving, protecting and storing material, said method comprising the steps of:
    receiving the material in an unprotected form from a remote source;
    generating a damaged version of the received material;

determining an authorization to process the received material;

storing the damaged version of the received material while determining the authorization; and repairing the damaged version of the received material to form a repaired version of the received material after determining the authorization, wherein:

said generating steps comprises damaging a select portion of the received material to form the damaged version, and wherein said step of repairing the damaged version comprises repairing a corresponding select portion of the damaged version to form the repaired version.

12. The method as claimed in claim 5, wherein the determining the authorization step is based on a verification of a presence of an entirety of a data set corresponding to the received material.

13. The method as claimed in claim 5, wherein the storing the damaged version step includes storing the damaged version on a removable media.

14. The method as claimed in claim 5, wherein the storing the damaged version step includes storing the damaged version in a temporary storage device, and wherein the method further comprises the step of:

storing the repaired version in a permanent storage device.

15. The method as claimed in claim 11, wherein said step of damaging a select portion of the received material includes performing an exclusive-OR operation on the select portion with a key, and said step of repairing the damaged version includes performing an exclusive-OR operation on the corresponding select portion of the damaged version with the key.

16. The method as claimed in claim 15, wherein said method further comprises the step of:

generating the key via a random process.

17. The method as claimed in claim 16, wherein the step of generating the key includes generating a series of random numbers via a pseudo-random process based on a key-seed.

18. The method as claimed in claim 15, wherein said method further comprises the step of:

destroying the key if a failure is reported in determining the authorization.

19. The method as claimed in claim 11, wherein said method further comprises the step of:

providing an undamaged version of the received material for rendering while determining the authorization.

* * * * *